Aug. 21, 1956 — H. H. DEUPREE — 2,759,640
CARTRIDGE GREASE GUN
Filed Feb. 15, 1954 — 2 Sheets-Sheet 2
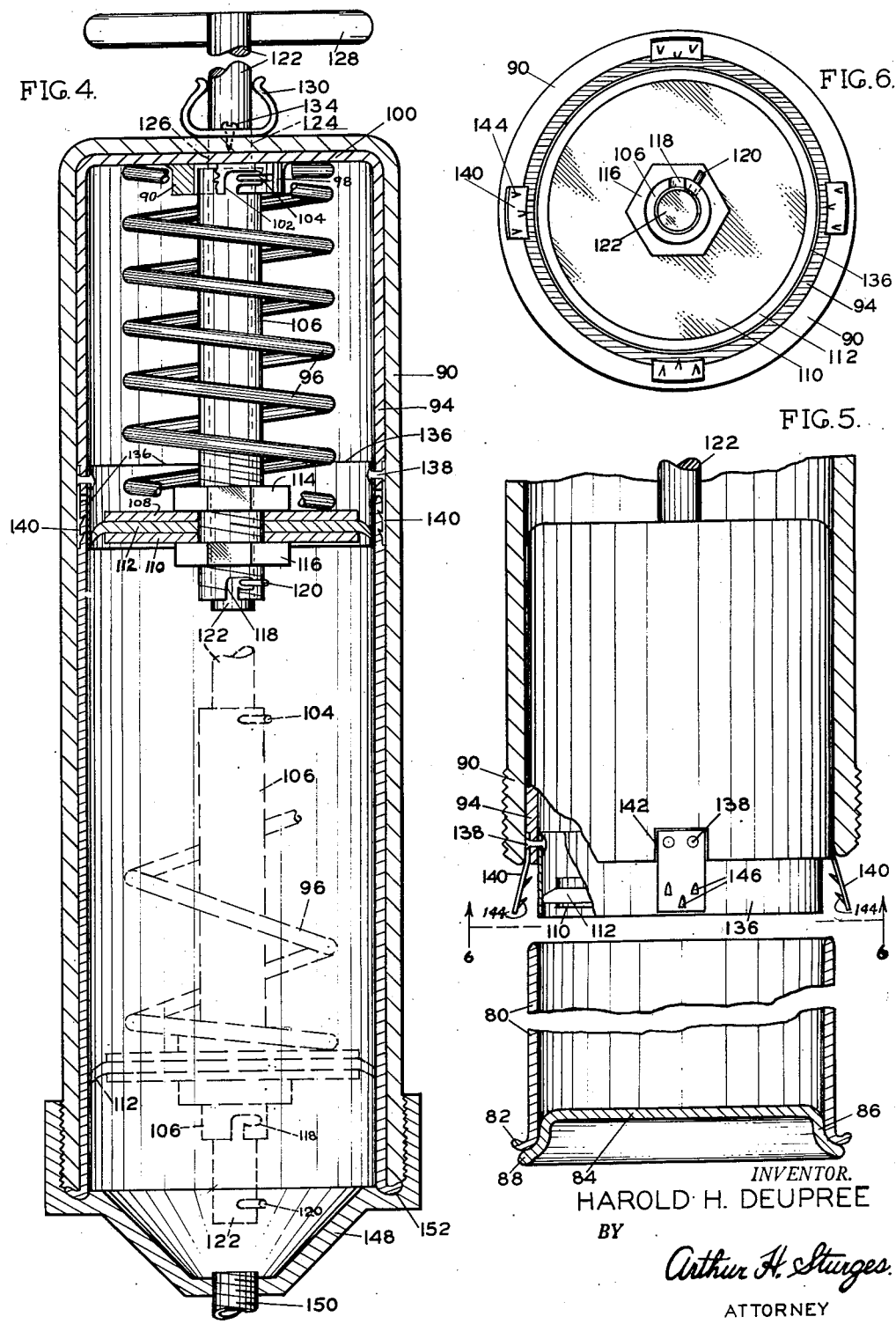
INVENTOR.
HAROLD H. DEUPREE
BY Arthur H. Sturges
ATTORNEY

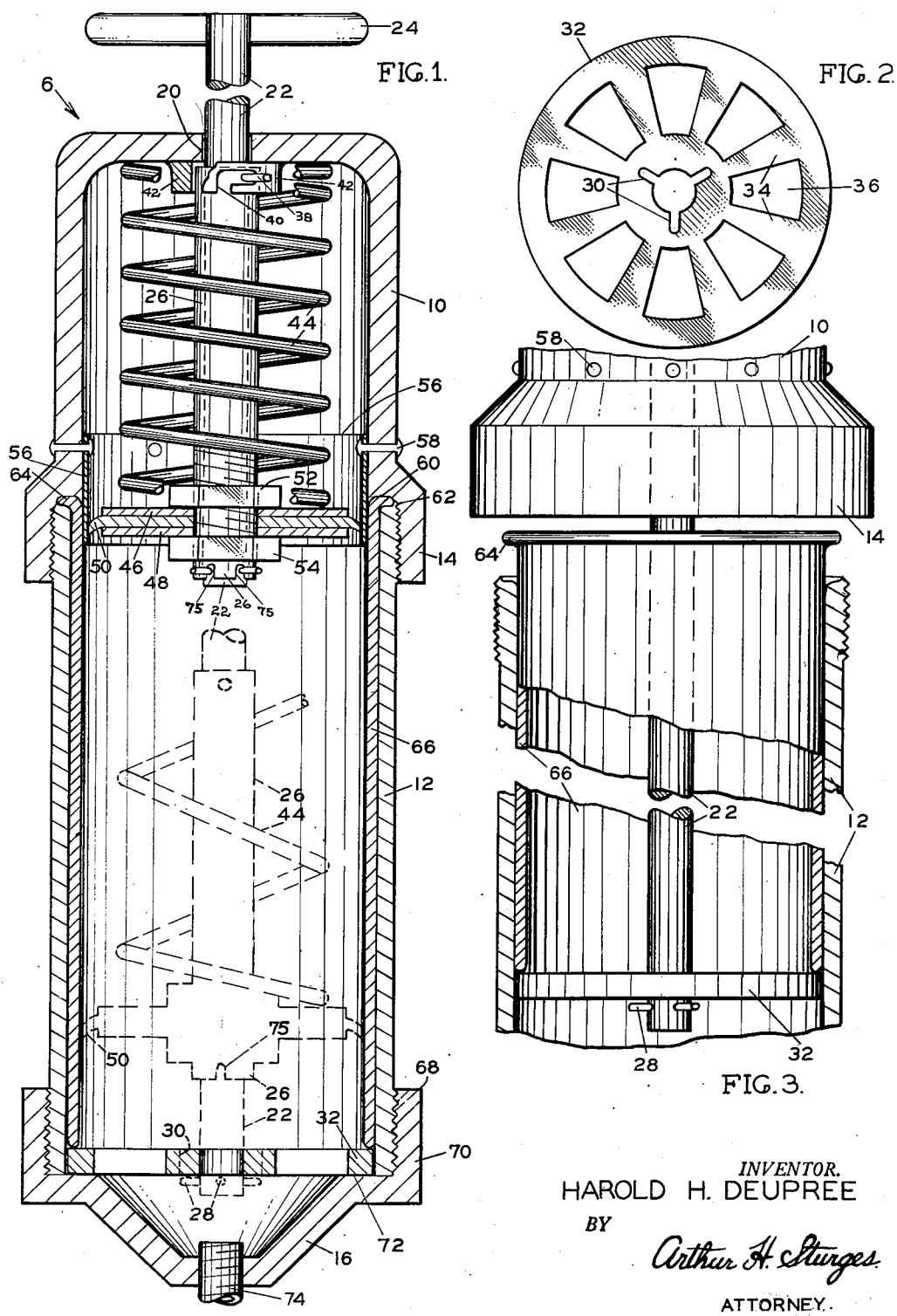

United States Patent Office 2,759,640
Patented Aug. 21, 1956

2,759,640

CARTRIDGE GREASE GUN

Harold H. Deupree, Woodbine, Iowa

Application February 15, 1954, Serial No. 410,307

6 Claims. (Cl. 222—326)

This invention relates to lubricating devices for machine tools, motor vehicles, farm implements and the like, particularly where grease is injected into special fittings, and in particular a grease gun designed to use a grease filled cartridge and in which a piston for forcing grease from the cartridge and gun and means for ejecting an empty cartridge shell are actuated by a common handle.

The purpose of this invention is to facilitate the removal of empty cartridges from grease guns and expedite the insertion of grease filled cartridges in the guns.

Packing grease guns is difficult as the stiff grease is hard to remove from barrels and other containers and also hard to pack in the barrels of grease guns. Also in packing grease guns by hand grit, dirt, and other foreign matter get into the grease and interfere with ejecting the grease from the guns. Furthermore, some foreign substances often work through into the grease fittings of the machines and restrict, or even stop, the travel of grease to the bearings. For this reason grease guns are designed to use grease cartridges, however, as the cartridges are discarded after use, it is essential that the cartridges be inexpensive, and, consequently, many cartridges are made of heavy paper, cardboard, and the like, which is not self-supporting, and in numerous instances the cartridges crumple as grease is forced therefrom, thereby making it substantially impossible to remove all grease therefrom.

With this thought in mind this invention contemplates a grease gun and a cartridge therefor, in which the shell of the cartridge is retained in tension until all grease is removed therefrom so that buckling or crumpling of the cartridge is substantially obviated.

The object of this invention is, therefore, to provide means in a grease gun adapted to use grease from a cartridge for holding the cartridge in the gun to prevent buckling in the shell of the cartridge as grease is used therefrom.

Another important object of the invention is to provide a grease filled cartridge for grease guns in which the end of the cartridge into which a piston or plunger for forcing grease from the cartridge is inserted is retained in position by gripping means in the gun.

Another object of the invention is to provide a grease gun which uses grease from a cartridge in which a piston for forcing grease from the cartridge and means for ejecting the shell of the cartridge are actuated by a common handle.

A further object of the invention is to provide a grease gun adapted to use machine filled grease cartridges so that all possibility of dirt, grit, and the like, being in the grease is eliminated.

It is yet another object of the invention to provide means in a grease gun using grease from cartridges and having a piston with a leather or fibrous washer therein for forcing the grease from the cartridges, for protecting the peripheral edge of the washer as shells of empty cartridges are removed and as new cartridges filled with grease are inserted in the grease gun.

A still further object of the invention is to provide a grease gun having a spring actuated piston for forcing grease from a removable cartridge therein in which the piston and spring by which the piston is actuated are mounted on a sleeve slidably mounted on an extended stem and in which latching means is provided for retaining the piston and sleeve in a position in which the spring is compressed as the stem is forced through grease in the cartridge to prevent the long stem being extended from the grease gun.

And a still further object of the invention is to provide a grease gun for using grease from cartridges in which means is provided for preventing the shell of a cartridge crumpling and also in which means is provided for protecting the peripheral edge of a fibrous washer of a grease ejecting piston, in which the grease gun and cartridge are of simple and economical construction.

With these and other objects and advantages in view the invention embodies a cylindrical housing having a head at one end and a cap on the opposite end, means in the housing for retaining a cartridge having grease therein in the housing, a piston carried by a sleeve slidably mounted on a stem extended into the housing, a spring extended around the sleeve, latching means for retaining the sleeve in such a position that the spring is compressed, a skirt mounted in the housing and positioned to protect a fibrous washer of the piston, and means for ejecting an empty shell of a cartridge from the grease gun.

Other features and advantages of the invention will appear from the following description taken in connection with the drawings, wherein:

Figure 1 is a longitudinal section through the improved grease gun with parts shown in elevation, and with a piston, sleeve, and lower end of a spring of the grease gun shown in an extended position in broken lines.

Figure 2 is a detail showing a plan view of a cartridge shell ejecting disc with other parts omitted.

Figure 3 is an exploded view illustrating a method of removing a cartridge shell from a cartridge retaining cylinder of the grease gun housing with parts broken away and parts shown in section.

Figure 4 is a longitudinal section through the grease gun, similar to that shown in Figure 1, illustrating a modification wherein the housing is formed with a continuous cylinder and means is provided in the upper part of the housing for gripping the inner end of a shell of a cartridge.

Figure 5 is an exploded view also illustrating a method of ejecting a shell of an empty cartridge, and also showing the method of forming the ends of the cartridge.

Figure 6 is a view looking upwardly toward the lower end of the housing of the grease gun shown in Figure 4, being taken on line 6—6 of Figure 5.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 6 refers to the invention as illustrated in Figures 1, 2 and 3 in its entirety, and numeral 8 to the modification shown in Figures 4, 5 and 6, also in its entirety.

In the design referred to by the numeral 6, the numeral 10 indicates a cylindrical head, numeral 12 a grease cartridge holding cylinder which is threaded into an outwardly extended flange 14 on the lower end of the head, and numeral 16 a cap threaded on the lower end of the cylinder 12.

The head 10 is provided with an upper end wall 18 in which a centrally disposed opening 20 is provided, and a stem 22, upon which the operating elements of the device are positioned is slidably mounted in the opening 20.

The outer end of the stem 22 is provided with a handle 24 and the inner end, which extends through a sleeve 26, is formed with three pins 28 that are positioned to pass through radially disposed slots 30 in an ejecting disc 32 positioned in the lower end of the cylinder 12. The disc 32 is formed with ribs 34 providing openings 36 through which grease from a cartridge is forced.

The upper end of the sleeve 26 is provided with a pin 38 that is positioned to coact with a bayonet slot 40 in an annular boss 42 on the inner surface of the end wall 18 of the head 10, and with the pin 38 in the slot 40 the sleeve is retained in the upper position, as shown in Figure 1, with a spring 44 which is extended around the sleeve, compressed. The lower end of the spring bears against a piston on the lower end of the sleeve whereby the piston is also retained in the upper position. The piston includes an upper washer 46, a lower washer 48, and a fibrous washer 50, the washers being clamped against a nut 52 threaded on the sleeve 26 with a nut 54.

The conventional leather washers of grease guns of this type are damaged in changing cartridges, and for this reason a thin metal skirt 56 is provided around the lower inner surface of the head 10. The skirt is secured in position with rivets 58, and, as shown in Figure 1, the skirt extends over a shoulder 60 at the upper end of an annular recess 62 in the flange 14. The flange 14 is threaded internally and the upper end of the cylinder 12 is provided with coacting threads whereby the cylinder is adapted to be threaded into the flange, with the upper edge of the cylinder clamping a flange 64 against the shoulder 60. By this means the upper end of a shell 66 of a cartridge is secured in the head of the grease gun as grease is forced from the cartridge by the piston or plunger.

The lower end of the cylinder 12 is also provided with threads and the threads on the lower end of the cylinder coact with threads 68 in a flange 70 forming the upper end of the cap 16 whereby a shoulder 72 in the cap retains the disc 32 against the lower edge of the shell 66 of the cartridge. The lower end of the cap 16 is provided with an outlet connection 74 by which grease is carried by a conventional flexible hose to a nozzle adapted to coact with grease fittings of machines and the like.

Three notches or recesses 75 are provided in the wall of the sleeve 26 at its lower end to receive the described pins 28 therein at times whereby the stem 22 is adapted to turn the sleeve 26 in order to engage and disengage the upward pin 38 from the bayonet slot 40 for releasing or locking the spring 44 and washer 50.

With the parts assembled in this manner grease in the cartridge is forced through the conventional applicator fittings on the ends of the connections 74 by the springs 44 in grease guns of this type, and after the grease is ejected from the cartridge the cap 16 is removed and the cylinder 12 unscrewed. The stem 22 is then forced downwardly to the position shown in dotted lines in Figure 1, with the pins 28 inserted in the slots 30. The stem is then turned so that the pins do not register with the slots and by drawing the stem upwardly the shell 66 of the cartridge may be extracted from the cylinder 12. In this operation the piston is retained in the skirt 56 whereby the peripheral edge of the washer 50 is covered and thereby prevented from being damaged.

The piston also remains in the skirt as a new cartridge is inserted in the grease gun wherein the cylinder 12 is again threaded into the flange 14 and the cap 16 threaded on the lower end of the cylinder.

In the design illustrated in Figures 4, 5 and 6, a cartridge 80, similar to the cartridge having the shell 66 is used, and, as shown in Figure 5, both ends of the cartridge are open and one end is provided with a flange 82. With the cartridge filled with grease, the ends are closed with heads 84 which are formed with flanges 86, and the edges of the flanges are provided with arcuate annular rims 88 that receive the annular edge at one end of the cartridge and also the flange 82 at the opposite end.

In the design shown in Figures 4, 5 and 6, the grease gun is formed with an elongated cylindrical housing 90 having a head 92 providing a closure for the upper end, and in this design the housing is provided with an inner cylindrical casing 94 in which a spring 96 similar to the spring 44 of the design shown in Figure 1, is positioned. The casing 94 is provided with an inner annular boss 98 which is positioned on the inner surface of the upper end 100, and which is provided with a bayonet slot 102 through which a pin 104, similar to the pin 38, extends. The pin 104 is positioned on the upper end of a sleeve 106 around which the spring 96 is positioned, and the lower end of the spring bears against a piston formed with an upper washer 108, a lower washer 110 and a sealing washer 112 which is formed of leather or other suitable material. The washers of the piston are clamped against a nut 114 threaded on the sleeve 106 by a nut 116 which is also threaded on the sleeve.

The lower end of the sleeve 106 is also provided with a bayonet slot 118 through which a pin 120 on a stem 122 extends, the stem 122 being similar to the stem 22 and extending through the sleeve 106 and also through an opening 124 in the head 92 and a registering opening 126 in the upper end 100 of the inner casing 94. The upper end of the stem is provided with a handle 128 and the portion of the stem at the sides of the handle is formed with sloping surfaces over which spring fingers 130 extending upwardly from a plate 132 snap to retain the handle extending unnecessarily from the housing and the grease gun.

The stem 122 is adapted to be turned by the handle to release the pin 120 from the slot 118 when it is desired to press the stem through grease in the gun so that the handle may be held by the spring fingers 130 to prevent the handle extending unnecessarily from the housing and to provide a compact grease gun.

The plate 132 from which the spring fingers extend is provided with an opening through which the stem 122 extends and the plate is secured to the end or head 92 with screws 134.

A skirt 136, similar to the skirt 56 is positioned around the lower end of the inner casing 94 to protect the peripheral edge of the sealing washer of the piston, and the skirt is secured in position with rivets 138 which also extend through spring gripping elements 140, the upper ends of which are positioned in recesses 142 and the lower ends of which are provided with pointed teeth 144 that are struck from triangular-shaped openings 146 in the spring elements. By this means the upper end of the shell of a cartridge is securely gripped by the teeth 144 whereby the cartridge is retained in position as grease is forced therefrom.

A cap 148, similar to the cap 16, is threaded on the lower end of the housing 90 and the lower end of the cap is provided with a connection 150, similar to the connection 74, and which is adapted to carry grease from the grease gun to fittings on machinery and the like.

The cap 148 is also provided with an annular groove 152 that is positioned to receive the flange 82 of the cartridge 80, whereby the lower end of the cartridge is clamped in position in the lower end of the housing.

The spring inherent in the gripping elements 140 urges the elements outwardly, as illustrated in Figure 5, when the end of the inner casing extends beyond the housing 90 thereby facilitating inserting the upper edge of a new cartridge between the skirt and gripping elements. With the cartridge inserted in this manner the inner casing is drawn upwardly whereby the teeth 144 will be forced into the shell of the cartridge.

In ejecting an empty cartridge shell from the housing 90 the cap 148 is removed and the stem 122 withdrawn and turned until the pin 120 is in engagement with the slot 118, and with the pin 104 in the slot 102 of the inner casing 94 the casing 94 is forced outwardly by the stem and handle 128 and the cartridge is ejected from the housing 90.

With the grease gun formed in either of these designs the necessity of hand packing grease in a grease gun is obviated and the possibility of having grit and dirt in the grease is reduced to a minimum. The leather sealing washer of pistons or plungers of grease guns is also protected from damage and the danger of shells of grease cartridges crumpling from the friction of the leather sealing washers is also obviated. Furthermore, with the grease cartridges secured in grease guns in this manner the empty cartridges may readily be ejected and filled cartridges may readily be installed.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent, is:

1. In a grease gun, the combination which comprises a cylindrical head having a closed upper end, a cylinder threaded in the lower end of the head, a cap having a grease outlet connection extended therefrom threaded on the lower end of the cylinder, a disc having openings and also radially disposed slots extended therethrough positioned in the lower end of the cylinder, a stem having radially disposed pins on the lower end extended through the closed end of the head and positioned whereby the pins are adapted to pass through the slots of the disc, a handle on the extended end of the stem, the inner surface of the closed end of the head having an annular boss with a bayonet slot therein extended downwardly therefrom, a sleeve slidably mounted on the stem and having a pin extended from the upper end, said pin of the sleeve being adapted to coact with the bayonet slot of the boss to retain the sleeve in an upwardly extended position, a piston having a sealing washer therein carried by the lower end of the sleeve, a skirt on the inner surface of the head and positioned to cover the sealing washer of the piston with the piston in the upper position in the grease gun, said cylinder being adapted to retain a grease cartridge with a flange on the upper end of the cartridge clamped between the cylinder and head, and a spring extended around the sleeve and positioned to urge the piston through a cartridge in said cylinder, said disc being adapted to be secured to the stem by the radially disposed pins for extracting the shell of a cartridge from said cylinder.

2. In a grease gun, the combination which comprises a cylindrical housing having a head in one end, a cap having a grease outlet connection extended therefrom positioned on the opposite or lower end of the housing, an inner casing slidably mounted in the housing, means on the lower edge of the inner casing for gripping the upper edge of a grease cartridge in the housing and positioned with a flange on the lower end thereof clamped between the cap and housing, a piston carried by the inner casing, means for latching the piston in an upper inoperative position, means for releasing the latching means from the exterior of the housing, and resilient means for urging the piston through the cartridge in the housing.

3. In a grease gun, the combination which comprises a cylindrical housing having an open lower end and a head in the upper end, a cap having a grease outlet connection extended therefrom threaded on the lower end of the housing, an inner casing slidably mounted in the housing, a skirt positioned against the inner surface of the inner casing and depending from said casing, spring elements having teeth on their inner surfaces also depending from the lower edge of the inner casing, an annular boss having a bayonet slot therein depending from the upper end of the inner casing, a sleeve having a pin on the upper end in the inner casing and positioned whereby the pin coacts with the bayonet slot for retaining the sleeve in the casing, a piston having a sealing washer therein carried by the lower end of the sleeve, the lower end of said sleeve also having a bayonet slot therein, a stem having a handle on the upper end and a pin on the lower end extended through the sleeve and head of the housing, said stem being positioned whereby the pin is adapted to coact with the bayonet slot in the lower end of the sleeve to provide temporary latching means between the stem and sleeve, spring fingers on the head of the housing for retaining the stem in the housing, a grease cartridge positioned in the housing with a flange on the lower end clamped between the cap and housing and with the upper end gripped by the teeth of said spring elements depending from the inner casing, and a spring extended around said sleeve for urging grease in the cartridge through the grease outlet connection of said cap.

4. In a grease gun, the combination which comprises an elongated housing, closed at one end and having a removable closure with an outlet opening therein on the opposite end, a piston in the housing, a stem extended from the piston through the closed end of the housing, a spring extended around the stem and positioned between the piston and closed end of the housing, spring fingers with gripping teeth thereon mounted in the housing and positioned to grip a grease container positioned in the housing, and latching means in the housing for retaining the piston in a retracted position.

5. In a grease gun, the combination which comprises an elongated housing, closed at one end and having a removable closure with an outlet opening therein on the opposite end, a piston in the housing, a sleeve having bayonet slots in the lower end and pins extended from the upper end positioned in the housing and on which the piston is mounted, a piston rod extended through the sleeve, piston, and closed end of the housing, said piston rod having pins on the end extended through the piston and said pins being adapted to coact with the bayonet slots in the lower end of the sleeve, the closed end of said housing having an annular boss on the inner surface and said boss having bayonet slots therein positioned to coact with the pins of the sleeve to retain the sleeve in the closed end of the housing, spring fingers with gripping teeth thereon positioned in the housing, and a grease cartridge having a flange extended outwardly from one end positioned in the housing with the flange secured between said closure and the end of the housing providing sealing means between the parts and with the inner end in engagement with the teeth of said spring fingers for retaining the cartridge in position in the housing.

6. In a grease gun: an elongated hollow housing; a cover cap having a bore therethrough for one end of said housing; a sleeve slidably disposed in said housing, means in the end of the housing opposite to the end on which the cover-cap is positioned for limiting movement of the sleeve in the housing, said sleeve having an offset end portion for providing a space between said housing and said end portion; said space being adapted to receive therein an end portion of a grease cartridge; and manually actuatable means for causing said sleeve to slide with respect to said housing.

References Cited in the file of this patent

UNITED STATES PATENTS

| | | |
|---|---|---|
| 1,540,182 | Outhier et al. | June 2, 1925 |
| 1,689,186 | Zabriskie | Oct. 23, 1928 |
| 1,924,841 | Eastman | Aug. 21, 1933 |
| 1,965,547 | Harris | July 3, 1934 |
| 2,003,107 | Dodge | May 28, 1935 |
| 2,079,744 | Maguire | May 11, 1937 |
| 2,102,939 | Bishop | Dec. 21, 1937 |
| 2,123,712 | Clark | July 12, 1938 |
| 2,394,488 | Rotter et al. | Feb. 5, 1946 |
| 2,717,724 | Martin | Sept. 13, 1955 |

FOREIGN PATENTS

| | | |
|---|---|---|
| 205,319 | Great Britain | Oct. 18, 1935 |